United States Patent [19]

Huber

[11] Patent Number: 4,792,037

[45] Date of Patent: Dec. 20, 1988

[54] DRIVE ROLLER UNIT

[75] Inventor: Thomas Huber, Iffeldorf, Fed. Rep. of Germany

[73] Assignee: Bavaria Cargo Technologie GmbH, Munich, Fed. Rep. of Germany

[21] Appl. No.: 160,427

[22] Filed: Feb. 25, 1988

[30] Foreign Application Priority Data

Jul. 21, 1987 [DE] Fed. Rep. of Germany ....... 3724126

[51] Int. Cl.⁴ .............................................. B65G 13/06
[52] U.S. Cl. ..................... 198/788; 198/782
[58] Field of Search .............................. 198/782, 788

[56] References Cited

U.S. PATENT DOCUMENTS

| 1,868,825 | 8/1930 | Grosjean | 198/788 |
| 3,698,539 | 10/1972 | Schwarzbeck | 198/782 |
| 3,712,454 | 1/1973 | McKee | 198/782 |
| 4,697,694 | 10/1987 | Huber | 198/782 |

Primary Examiner—Robert J. Spar
Assistant Examiner—James R. Bidwell
Attorney, Agent, or Firm—Sughrue, Mion, Zinn, Macpeak & Seas

[57] ABSTRACT

A drive roller unit for driving articles on a conveyor track includes a drive roller which is of a hollow cylindrical configuration and which encloses therewithin an electric motor assembly for driving same as well as a transmission arrangement for transmitting the drive torque from the motor to the drive roller. The drive roller is supported in the unit in such a way as to be movable between a lowered rest position in which it is out of contact with an article on the conveyor track and a raised operative position of engaging an article to be driven thereby. The roller is raised by virtue of a reaction movement of the drive motor stator assembly, in reaction to the rotor inertia causing a resistance to rotation of the rotor when the drive unit is switched on, the stator arrangement being mounted eccentrically relative to the axis of the roller so that that reaction movement of the stator arrangement causes it to climb up towards the article to bring the roller into driving engagement therewith.

12 Claims, 5 Drawing Sheets

DRIVE ROLLER UNIT

BACKGROUND OF THE INVENTION

The present invention relates generally to a drive roller unit for driving articles to be conveyed on a conveyor track.

Roller-type or ball-type conveyor tracks in which articles to be conveyed thereon are supported movably on a plurality of support rollers or balls often include drive roller units for driving the articles to be conveyed, for example frieght containers. A preferred area of use of such arrangements are frieght loading systems in air freight traffic, in which the freight containers and transported in the freight compartment of an aircraft on such conveyor tracks until the containers are at the anchorage locations at which they are to be held fast during a flight.

A drive roller unit as is disclosed for example in U.S. Pat. No. 3,698,539 comprises a drive roller which is driven in rotation by an electric motor by way of a transmission arrangement. The drive roller is mounted rotatably on a guide structure, by means of which it is movable relative to a base construction between a lowered rest position and a raised drive position in which it engages the underside of an article to be driven thereby. The transmission arrangement includes a drive gear which is driven by the electric motor and which meshes with a tooth configuration non-rotatably disposed on the drive roller. The axis of rotation of the drive gear is stationary relative to the base structure. More specifically that unit has a main frame which is to be secured to the floor for example of a freight compartment, and a mounting structure which is mounted at one end pivotably on the main frame and which carries the motor in the vicinity of the axis of pivotable movement. Disposed at a spacing from the axis of pivotal movement is the drive roller which is thus mounted rotatably, being in a stationary position relative to the mounting structure, also including a cam control arrangement which is connected to the free end of the mounting structure and by means of which the mounting structure is pivotable relative to the main frame from the rest position of the drive roller into the operative position. The output shaft of the motor is mounted to the input of a planetary-type transmission having one output which is coupled by way of a transmission to the drive shaft of the drive roller while the other output drives the cam control arrangement.

In the rest condition of the unit the mounting structure lies on the main frame so that the drive roller is in a lowered position at a spacing from the bottom of a freight container which is moved thereover on a roller conveyor track. In order to set the freight container moving on the roller conveyor track, the motor is first switched on, to drive the input of the planetary transmission. At that time the drive roller is prevented from rotating by virtue of the inclusion in the arrangement of a slipping clutch which is set to provide a predetermined level of braking torque so that the drive moment of the motor positively acts by way of the other output of the planetary transmission to drive the cam control arrangement which accordingly, by way of its cams which bear against the main frame, pivots the mounting structure upwardly into the operative position in which the drive roller comes into engagement with the underside of the floor of a feight container. Due to the weight of the freight container, that engagement between the drive roller and the freight container causes the movement of the cam control arrangement to be blocked and the drive roller is pressed against the bottom of the container. However that also causes the output of the planetary transmission which drives the cam control arrangement to be blocked so that the other output of the planetary transmission, which drives the drive roller, now transmits to the drive roller a torque which overcomes the braking torque of the slipping clutch so that the drive roller, in the condition of being pressed against the bottom of the freight container, begins to rotate and the container is thus displaced on the conveyor track in a direction which depends on the direction of rotation of the drive motor.

A problem which arises with that arrangement in a practical situation is that the complete transmission arrangement for transmitting torque from the motor to the drive roller on the one hand and to the cam control arrangement on the other hand is of a very complicated construction and involves a large number of components. In addition, a cam control structure is required so that the overall construction includes a large number of mechanically moving components. That not only gives rise to a high level of manufacturing costs, but it also involves a large structure and also a high weight which is extremely undesirable in the context of an aircraft structure. Furthermore the large number of components which are movable relative to each other gives rise to an undesirably high level of susceptibility to wear and the periods of time between successive maintenance operations are short in order to ensure that the arrangement affords the high level of reliability required in aircraft.

In addition, that drive roller unit uses a slipping clutch in the form of what is referred to as a fluid friction clutch, the operating characteristics of which are highly dependent on temperature. Therefore, due to the high temperature differences which occur in an aircraft freight compartment, it is necessary for the maximum torque of the slipping clutch to be selected at such a high level that the clutch torque does not fall below the minimum value required, even under the most disadvantageous temperature conditions. However that gives rise to very high force peaks when initiating the rotary movement of the drive roller in the condition of being pressed against the bottom of a freight container, and such forces act on the floor structure of the aircraft freight compartment. That is extremely undesirable in a practical situation as specific limit loadings in respect of the floor structure are not to be exceeded and in addition shock loadings are highly undesirable.

Yet another difficulty with the drive roller unit set forth above is that it is of a really large size and the individual components lie more or less unprotected side by side so that in operation the unit is not only liable to suffer from fouling and defects and interruptions in operation as a result thereof, but it is also liable to suffer from damage due to objects which penetrate into the mechanism or by virtue of being directly subjected to an outside force which interferes with the mechanism.

A similar form of drive roller unit is to be found in EP-B1-0 149 658, which also suffers from problems due to foreign bodies penetrating into the mechanism or a force acting thereon to cause it to become defective, besides being of large size.

SUMMARY OF THE INENTION

An object of the present invention is to provide a drive roller unit for driving an article on a conveyor track, which is of a more compact construction and of lower weight than previous such units.

Another object of the present invention is to provide a conveyor track drive roller unit which is adequately protected from fouling and damage.

Yet another object of the present invention is to provide a conveyor track drive roller unit which is of such a design configuration that it can be readily fitted into a conveyor track arrangement as required.

A further object of the present invention is to provide a drive roller unit for a conveyor track, constituting a self-contained assembly adequately protected within an enclosing structure.

In accordance with the present invention, these and other objects are attained by a drive roller unit for driving an article on a conveyor track, comprising a drive roller which is adapted to be driven in rotation by an electrical motor by way of a transmission means. The drive roller is substantially in the form of a hollow circular cylinder, with the electric motor and the transmission means being disposed in the interior thereof. The drive roller is rotatably mounted in such a manner that it is movable relative to a support base structure between a lowered rest position and a raised drive position in which, in a conveyor track, the drive roller is in engagement with an underneath surface of an article to be driven thereby. The transmission means includes a drive gear which is adapted to be driven by the electric motor and which meshes with a tooth configuration non-rotatably disposed on the drive roller, the axis of rotation of the drive gear being stationary relative to the base structure. The rotor of the electric motor is coupled to the drive gear for driving same, while the stator arrangement of the electric motor includes a guide means in the form of a circular-cylindrical outside circumferential surface which is arranged in concentric relationship with respect to the axis of rotation of the drive gear and surrounds the rotor. The drive roller is mounted rotatably on the outside circumferential surface of the stator arrangement concentrically with respect thereto while the tooth configuration non-rotatably disposed on the drive roller and meshing with the drive gear is an internal ring gear means which is disposed non-rotatably on the inside of the hollow-cylindrical drive roller and in concentric relationship therewith. The drive gear is eccentric with respect to the internal ring gear means and the latter is driven by the drive gear, in the same direction.

In the configuration in accordance with the principles of the present invention therefore all the moving compartments such as the transmission arrangement, the drive motor and the guide means for movement of the drive roller between the lowered rest position and the raised drive position are disposed within the interior of the hollow-cylindrical drive roller so that all those elements are protected from contamination and damage. Furthermore, the drive roller unit in accordance with the invention is of considerably smaller size than previous units as all the component parts thereof are disposed within the drive roller member itself which in turn corresponds to the dimensions of the drive roller of a previous drive roller unit. The simple and compact construction of the drive roller unit according to the invention also provides for a reduction in the weight thereof.

A further particular advantage of the unit according to the invention is that the entire unit is the same in regard to the outside dimensions thereof as non-driven support rollers which are used in a roller conveyor track, so that the drive roller unit of the invention can be used interchangeably in relation to a support roller in a roller conveyor track at any desired location or locations, depending on the respective requirements involved.

The drive roller unit of the invention also has the further advantage that it is so-to-speak self-actuating in that it does not require a separate control arrangement for moving the drive roller into the operative position. Thus, when the drive roller unit is set in operation by a supply of power to the electric motor, a torque acts between the rotor and the stator arrangement of the electric motor. Due to the inherent inertia of the rotor however it initially remains in a stationary condition so that the motor torque rotates the stator arrangement around the axis of rotation of the drive gear which, relative to the base structure, is in a stationary location. Due to that rotary movement of the stator arrangement, as the stator arrangement is eccentric relative to the axis of rotation of the drive gear, the drive roller which is suitably supported on the stator arrangement is moved from its lowered rest position into its raised operative position in which it comes into contact with the bottom of an article disposed thereabove. The stator arrangement can therefore no longer rotate so that the motor torque overcome the intertia of the rotor and the latter begins to rotate. That rotation of the rotor is transmitted to the drive gear which meshes with the internal ring gear of the drive roller and therefore causes it to rotate in the same direction. As the drive roller is pressed against the underneath surface of the article to be driven thereby, a tangential conveying force is applied thereto and the article begins to move on the roller track in the desired fashion.

In a preferred feature of the invention, the rotor is coupled to the drive gear by way of a step-down transmission means. That provides that it is possible to use a normal electric motor in its range of high speeds of rotation, which is advantageous in terms of motor efficiency, while nonetheless making it possible to provide the desired low speed of rotation of the drive roller.

In an advantageous feature of the invention, the step-down transmission means is a planetary transmission means providing first, second and third transmission stages which occur in succession axially in the direction of the axis of rotation of the drive gear. A transmission means of that kind is distinguished by being of a very compact construction with particularly small dimensions in the radial direction, while in addition it is possible to achieve a very high step-down ratio.

Although the construction in accordance with the principles of the present invention provdies that the drive roller is raised from its rest position into its operative position when the electric motor is switched on by virtue of the rotor having a considerable level of inertia and in addition being prevented from rotating by virtue of the inertia of the transmission means and the friction therein, it is nonetheless advantageous for the roller drive unit additionally to include a brake means for braking the drive gear relative to the base structure. The brake means ensures that, irrespective of manufacturing tolerances and inherent friction in the transmission means, which is dependent on all kinds of factors, the drive roller is in any case firstly lifted into its operative position when the drive roller unit is switched on, and is thus pressed against the article disposed thereabove, before the actual drive rotation of the drive roller begins.

In another preferred feature of the invention the brake means is in the form of a mechanical roller friction brake as such a brake construction provides a braking moment which is pratically independent of temperature and speed of rotation.

In a preferred construction in accordance with the invention, the stator arrangement comprises a stator body of rotationally symmetrical configuration coaxial with the rotor and including a stator winding, and a stator housing which is disposed around the stator body and which is formed eccentrically with respect to the rotor, the drive roller being mounted on the circumferential surface of the stator housing, which is of circular cross-section. The two-part design configuration of the stator arrangement makes it possible to use commercially available components of an electric motor for the actual stator body and the rotor. It is only the stator housing that then has to be produced as a special component, to provide the required eccentricity.

In a preferred feature of the present invention the externally circular-cylindrical stator housing includes an axial bore extending therethrough in eccentric relationship with the axis of the hollow cylinder, the stator body being accommodated in a portion of the eccentric bore while the free portion of the inside wall surface of the bore is provided with an internal tooth means serving as the crown wheel of the step-down transmission means referred to above. The stator housing is thus likewise in the form of an integral component of the step-down transmission means, thus providing a saving in regard to mechanical components, as well as giving a lower weight.

It is particularly advantageous in practice for the electric motor to be in the form of a three-phase asynchronous motor. The motor provides a high level of starting torque, while being small and compact.

A preferred embodiment of the invention provides that the supply of power to the stator winding is by way of a plurality of concentric slip rings co-operating with spring-biased contact members which are stationary relative to the base structure. The contact members are electrically connectible to corresponding power supply conductors in the structure of a roller conveyor track.

In a further preferred feature of the invention the drive roller comprises an inner metal roller body carrying the internal ring gear means and bearing running surfaces for support bearings, and a roller casing portion which is disposed on the outside circumferential surface of the roller body and which comprises wear-resistant plastic material, preferably with a Shore hardness of about 60 Shore A. That construction ensures that the drive roller has a surface which, although being elastic, is extremely resistant to wear and long-lasting in operation of the unit, while nonetheless the internal ring gear means which represents one component of the transmission arrangement can be formed directly in the roller body, thus saving on weight and the components involved.

Further objects, features and advantages of the present invention will be apparent from the following description of a preferred embodiment.

DESCRIPTION OF PREFERRED EMBODIMENTS

Figure 1:
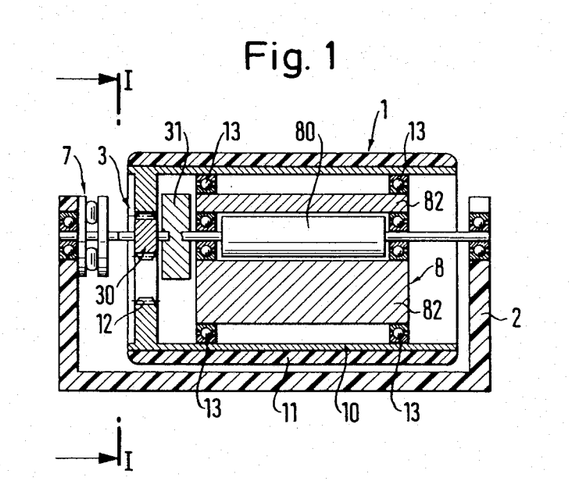
FIG. 1 is view in axial longitudinal section of a drive roller unit which is shown in highly simplified and diagrammatic form, to illustrate the basic structure and the mode of operation of a drive roller unit according to the invention.
Figure 2:
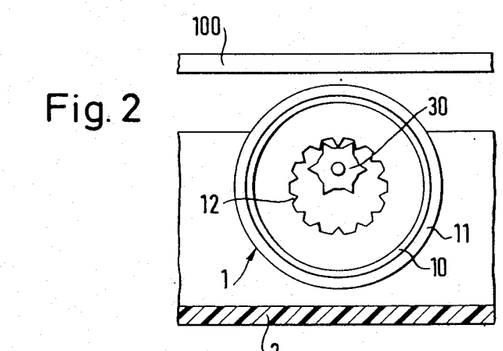
FIG. 2 is a view in section taken along line I—I in FIG. 1, showing the drive roller in the rest condition thereof.
Figure 3:
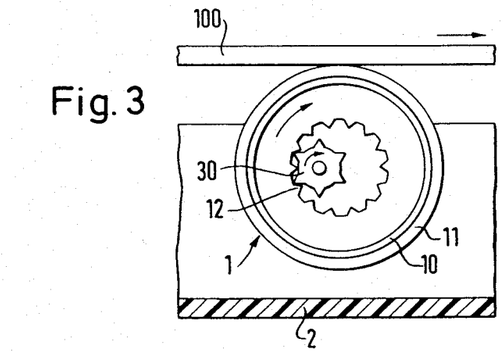
FIG. 3 is a view similar to that shown in FIG. 2 but showing the drive roller in its raised operation position in which it is pressed against an article to be driven thereby.

Referring firstly to FIGS. 1 through 3, the basic construction and the mode of operation of a drive roller unit according to the invention will first be described. It will be appreciated that FIGS. 1 through 3 show the structure of the invention in a very simplified and diagrammatic form, for the purposes of description at this stage.

As shown in FIG. 1, the drive roller unit basically comprises a drive roller 1 which is in the from approximately of a hollow circular cylinder and in the interior of which is disposed a motor assembly 9 drivingly coupled to the drive roller 1 by way of a transmission arrangement 3. The entire drive roller unit is accommodated in an upwardly open U-shaped structural portion of a roller conveyor track, which serves as a base structure as indicated at 2.

The electric motor assembly 8 includes a stator arrangement 82 and a rotor 80 which is mounted rotatably relative to the base structure 2 and relative to the stator arrangement 82. The rotor shaft of the rotor 80 drives a step-down transmission 31 which is shown in diagrammatic form as a box in FIG. 1. The transmission 31 has has an output shaft which in turn non-rotatably carries a drive gear 30, the axis of rotation of which is disposed at a stationary location relative to the base structure 2.

The stator arrangement 82 of the electric motor assembly 8 includes field windings (not shown) and embraces the rotor 80 at a close radial spacing therefrom in known fashion in the context of an electric motor. Unlike the situation in a conventional electric motor however, although the outside circumference of the stator arrangement 82 is of circular cross-section, relative to the axis of rotation of the rotor 80, it is eccentric with respect to the axis of rotation of the rotor and in particular is eccentric with respect to the axis of rotation of the drive gear 30.

As can be seen from FIG. 1, the drive roller 1 comprises an inner roller body 10 which is substantially in the form of a hollow cylinder and a roller casing portion 11 of elastic material, which covers the outside circumferential surface of the roller body 10. Formed in the vicinity of one axial end of the roller body 10 (at the left in FIG. 1), on the inwardly facing surface thereof, is an internal ring gear as indicated at 12 in FIG. 1 which is concentric with respect to the roller body 10 and which is in meshing engagement with the drive gear 30 which is eccentric relative thereto. The drive roller 1 is mounted rotatably on and in concentric relationship with the circular-cylindrical outside circumferential surface of the stator arrangement 82 by means of bearings 13 which may be in the form of for example needle or ball bearing assemblies, so that on the one hand meshing engagement between the drive gear 30 and the internal ring gear 12 is constantly ensured and at the same time the eccentric arrangement of the drive roller 1 and the internal ring gear 12 relative to the axis of rotation of the drive gear 30 is maintained.

FIG. 2 shows the rest position of the drive roller of FIG. 1 and the eccentric engagement of the drive gear 30 with the internal ring gear 12 of the drive roller 1. It will also be seen from FIG. 2 that, by virtue of that eccentricity, the upper portion of the outer circumferential surface of the drive roller 1, in the rest position of the drive roller unit, is disposed at a spacing from an article such as a freight container, as indicated at 100, which is disposed thereabove on a conveyor track.

If now with the drive roller unit in the rest condition shown in FIG. 2 the supply of power to the electric motor arrangement 11 is switched on, then, as in the case of any other electric motor, a torque acts between the rotor 80 and the stator arrangement 82. Because of the considerable inherent inertia in the heavy rotor 80, the inherent interia of the components of the step-down transmission 31, the interia of the transmission arrangement 3 and the inertia of the drive roller 1 as well as the frictional forces in the transmission arrangement 3 and the step-down transmission 31, the rotor initially remains stationary and the torque applied by the electric motor assembly 8 therefore causes the stator arrangement 82 to rotate in the opposite direction to the intended direction of rotation of the rotor 80, so that the eccentric part of the stator arrangement 82 rotates upwardly about the axis of rotation of the drive gear 30, whereby the drive roller 1 is also moved upwardly until it comes into contact with the underneath surface of the article 100 on the conveyor track, which is then the condition shown in FIG. 3. Due to the weight of the article 100, further movement of the drive roller 1 in an upward direction as described above is prevented so that the stator arrangement 82 is also unable to rotate any further and therefore the rotor 80 must now begin to rotate, against the above-mentioned blocking forces. That rotary movement of the rotor 80 is transmitted in the same direction to the drive gear 30 by way of the step-down transmission 31 and the drive gear 30 now drives the ring gear 12 and therewith the drive roller 1 in the same direction, as indicated by the arrows in FIG. 3. The rotary movement of the drive roller 1 which is pressed against the underneath surface of the article 100 applies a tangential force to the article 100 so that the article begins to move in the direction indicated by the arrow positioned above same in FIG. 3.

If now in that condition the supply of power to the electric motor assembly 8 is switched off, the rotor 80 comes to a halt and the stator arrangement 82 with the drive roller carried thereby move downwardly again, under the effect of their eccentric weight, by virtue of a pivotal movement about the drive gear 30, into the rest position shown in FIG. 2 in which the drive roller 1 is no longer engaged with the article 100.

As shown in FIG. 1, the above-described and illustrated arrangement may additionally include a brake which can produce a braking force as between the base structure 2 and the drive gear 30. The brake 7 serves to assist with holding the rotor 80 in the initially stopped condition when supply of power to the electric motor assembly 8 is first switched on with the drive roller 1 in its rest position. Although the brake 7 is not absolutely essential it does however provide for a defined braking moment which acts on the rotor 80 so that manufacturing tolerances and operational effects acting on the inherent friction in the transmission arrangement 3 and the step-down transmission 31, can be disregarded, in regard to operability of the drive roller unit. In addition, the brake 7 makes it possible to keep down the weight of the assembly which contributes to determining the inertia of the rotor 80, the step-down transmission 31, the transmission arrangement 3 and the drive roller 1. As diagrammatically indicated in FIG. 1, the brake 7 may be in the form of a mechanical roller friction brake comprising a pair of brake disks which are rotatable relative to each other and, between the brake disks and distributed over the periphery thereof, a plurality of brake rollers which are in a spring-biased condition therein.

Reference will now be made to FIGS. 4 through 8 showing a practical embodiment of a drive roller unit in accordance with the invention, shown in simplified form in regard to a number of detailed features thereof. As can be seen from the axial longitudinal sectional view in FIG. 4, the drive roller unit is carried in a channel-shaped structural portion of a roller conveyor track, that portion serving as a base structure as indicated at 2 and being of a U-shaped cross-section which is open upwardly in FIG. 1. The drive roller unit is mounted and held in the base structure 2 at the two axial ends of the unit, which are at the right and at the left in FIG. 4, by means of snap-fitting mounting members 4 which are engaged into suitably shaped openings in the structural portion of the roller conveyor track. A roller conveyor track structure of that kind with the snap-fitting mounting members 4 is described in greater detail in our co-pending patent application U.S. Ser. No. 160,448 filed Feb. 25, 1988, to which reference is therefore directed and the content of which is thereby incorporated herein.

Figure 4:
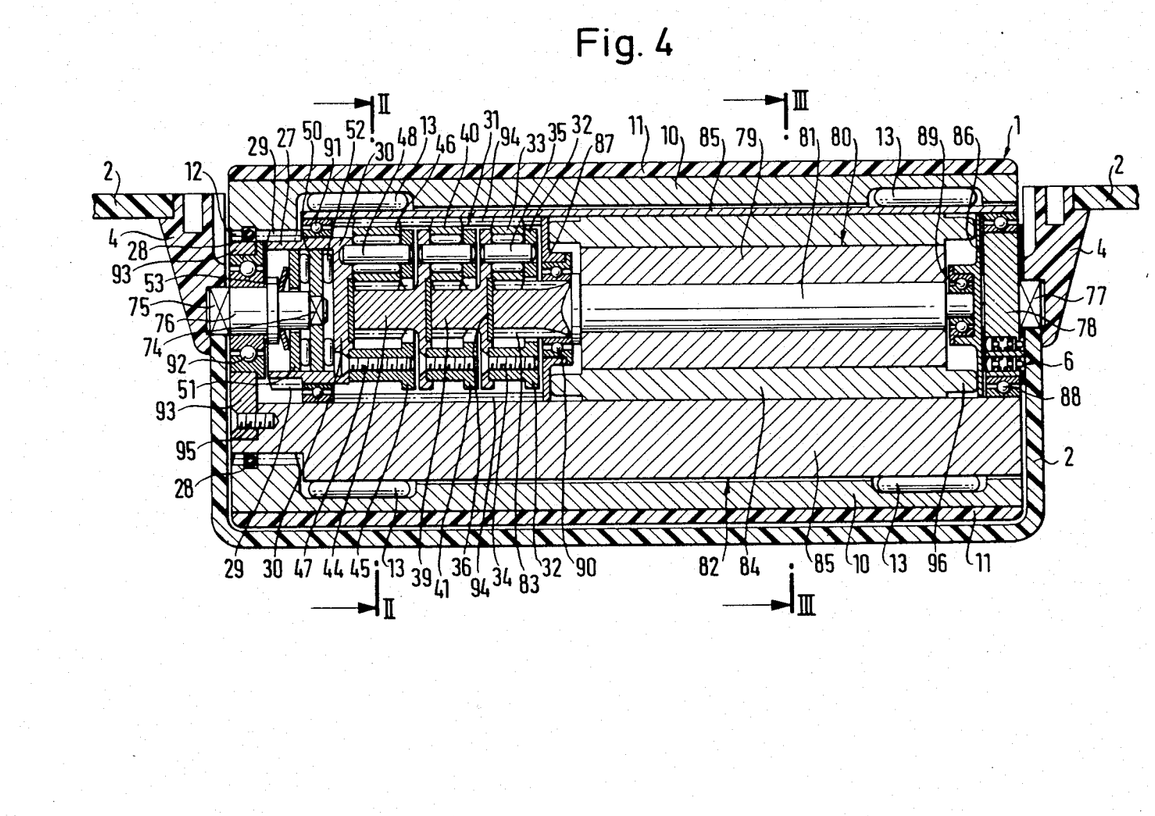
FIG. 4 is a view in axial longitudinal section through an embodiment of the drive roller unit according to the invention, fitted into a shaped structural portion of a roller conveyor track.
Figure 5:
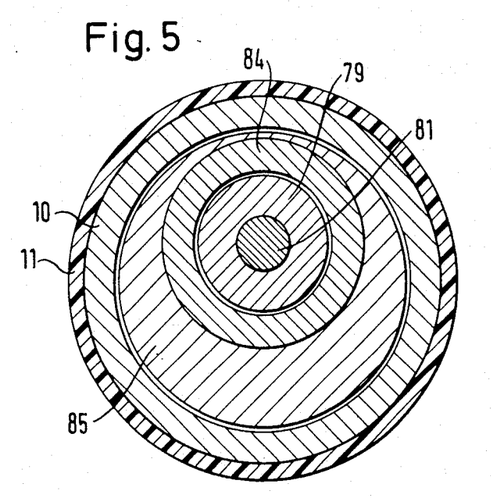
FIG. 5 is a view in cross-section taken along line III—III in FIG. 4.
Figure 6:
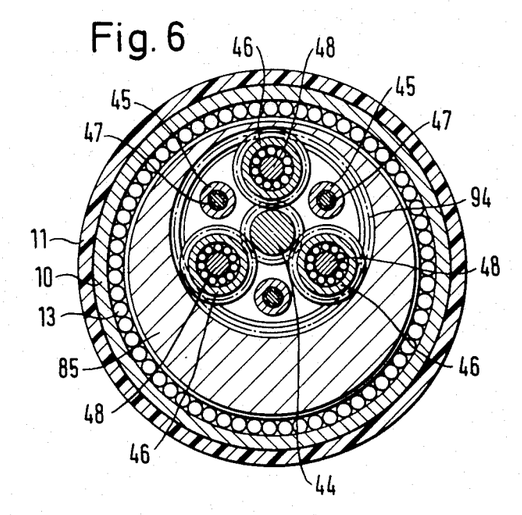
FIG. 6 is a view in cross-section taken along line II—II in FIG. 4.

As can be seen in particular from FIG. 4, the illustrated embodiment of the drive roller unit comprises a drive roller 1 accommodating an electric motor assembly comprising a stator arrangement 82 and a rotor 80. The stator arrangement 82 includes the actual stator body 84 with a stator winding which is only shown in diagrammatic form by way of indication at 96. The stator body 84 is of a generally rotationally symmetrical configuration in conventional member and is disposed concentrically around the rotor 80 at a small spacing therefrom. The stator arrangement 82 also includes a stator housing 85 whose outside circumferential surface approximately represents a circular cylinder and through which passes a bore which is eccentric relative to the axis of the circular cylinder. The stator body 84 is accommodated in the eccentric bore, being non-rotatably connected to the stator housing 85, but it will be noted that the stator body 84 only extends over a part of the length of the bore (being the part shown at the right in FIG. 4). Provided adjacent the end of the bore which is at the right in FIG. 4 is a radial mounting flange 86 which is non-rotatably connected to the stator housing 85 and which carries a rolling bearing assembly 89 which is concentric with respect to the rotor 80. Disposed outside the flange 86, in the axial direction of the assembly, and adjoining the right-hand axial end of the stator housing 85, within the bore, there is a further rolling bearing assembly 88 which is concentric with respect to the rolling bearing assembly 89. A further mounting flange 87 is also arranged approximately at the center of the bore which passes through the stator housing 85. The further flange 87 is non-rotatably connected to the stator housing 85 and carries a rolling bearing assembly 90 which is concentric with respect to the bore.

At the left-hand end face of the stator housing 85 in FIG. 4, a further radial mounting flange 93 is fixed to the stator housing by screw means or bolts 95, in such a position as to terminate flush therewith. The flange 93 carries a rolling bearing assembly 92 concentrically with respect to the longitudinal center line of the bore through the stator housing 85. Finally, a rolling bearing assembly 91 is arranged adjacent to the left-hand end of the stator housing in FIG. 4, but at a spacing therefrom, within the bore extending through the stator housing 85. The rolling bearing assembly 91 is also concentric relative to the bore.

The rolling bearing 88 at the right-hand end of the stator arrangement 82 is carried on a mounting plate or disk 78 so that the entire stator arrangement 82 is freely rotatable on the plate 78. The plate 78 is provided with a four-sided such as square projection 77 which projects axially outwardly of the roller assembly, therefore towards the right in FIG. 4, and serves to mount the entire drive roller unit in the base structure 2 by means of the snap-fitting mounting member 4. The rolling bearing assembly 92 at the left-hand end of the stator housing 85 is carried on a further mounting trunnion 76 and thus mounts the stator housing 85 rotatably thereon. The trunnion 76 is provided with a four-sided such as square projection 75 which projects axially outwardly towards the left in FIG. 1 and which serves in the same manner as the projection 77 to mount the entire drive roller unit in the base structure 2 by means of a corresponding snap-fitting mounting member 4.

The rotor 80 of the electric motor assembly is accommodated in conventional manner within the stator body 84 which is non-rotatably connected to the stator housing 85. The rotor 80 comprises a rotor body 79 which is carried in concentric and non-rotatable relationship on a rotor shaft 81 which extends beyond the rotor body 79 at both ends thereof. The end of the rotor shaft 81 which projects outwardly towards the left in FIG. 4 is mounted rotatably relative to the stator housing 85 by means of the rolling bearing assembly 90 while the part of the rotor shaft 81 which projects out of the rotor body 79 at the right-hand end in FIG. 4 is mounted rotatably by means of the rolling bearing assembly 89.

The drive roller 1 is substantially in the form of a hollow circular cylinder disposed around the stator arrangement 82. The drive roller 1 comprises a roller body 10 and a roller casing portion 11 which covers the outside circumferential surface of the roller body 10 and which is fixedly connected to the roller body 10. The roller causing portion 11 comprises an elastic material which is resistant to wear and in particular abrasion, more particularly for example styrene-butadiene rubber with a Shore hardness of about 60 Shore A, while the roller body 11 is made for example from metal. In the vicinity of each of the two axial ends of the roller body 10, at the inward side of the roller body, is a respective rolling bearing assembly 13, preferably a needle bearing assembly, which rotatably mounts the roller body 10 on the cylindrical outside circumferential surface of the stator housing 85. The region of the roller body 10 which adjoins the left end thereof in FIG. 4 is provided with a portion which extends radially inwardly and which thus increases the radial thickness of the roller body in that region. Formed on the inwardly facing surface of the inwardly extending portion is an internal ring gear 12 concentric with respect to the longitudinal center line of the hollow-cylindrical roller body 10. Provided in the region of the ring gear 12 is a circumferential groove which accommodates a seal illustrated in the form of an O-ring 28 which provides a seal relative to the adjacent outside circumferential surface of the stator housing 85 or the mounting flange 93 secured thereto.

Disposed within the bore which passes through the stator housing 85, at the left in FIG. 4 of the mounting flange 87 which supports the rotor shaft 81, is the step-down transmission 31 which is in the form of a planetary transmission with three transmission stages which are disposed in succession in the axial direction of the assembly. The planetary transmission is of a conventional design configuration from the point of view of the function thereof so that the following brief description is sufficient to arrive at an adequate understanding thereof, for the purposes of the present invention.

In the first stage the planetary transmission includes a planet wheel carrier 32 on which three planet wheels 33 are mounted by means of mounting trunnions 35. The planet wheels 33 rotate in mesh with a sun gear which is formed by an external tooth configuration as indicated at 83 on the left-hand end of the rotor shaft 81.

The left-hand end in FIG. 4 of each mounting trunnion 35 is mounted in a radial flange provided by the sun wheel 39 of the second transmission stage. The flange is fixed by means of screws 34 to the planet wheel carrier 32 of the first stage. The planet wheels 40 of the second stage are mounted similarly to those of the first stage on mounting trunnions on the one hand in the associated carrier 41 and on the other hand in a radial flange provided by the sun wheel 44 of the third stage of the transmission. The third transmission stage also has planet wheels 46 which are mounted on the one hand in the associated carrier 45 while on the other hand they are mounted in a radial flange, which axially adjoins the sun wheel 44 at the left in FIG. 4, of a drive gear 30 which provides the output of the third stage of the transmission. The radial flange on the drive gear 30 is fixedly connected by means of the bolts or screws 47 to the planet wheel carrier 45 of the third transmission stage. Over the entire region of the step-down transmission 31 the inside wall of the stator housing 85 is provided with internal teeth indicated at 94 which mesh with the planet wheels 33, 40 and 46, as can be seen for example from FIG. 6, in respect of the third transmission stage.

With that construction therefore the entire crown wheel of the three stages of the planetary transmission is formed in one piece with the stator housing 85, thus giving a saving in weight and requiring a smaller number of individual components.

In order to reduce the friction between the individual transmission stages, a freely movable bearing disk 36 is arranged in each case between the face of a respective sun wheel which is towards the left in FIG. 4, and the part which is most closely adjacent thereto, for example the next sun wheel or, in the case of the third stage of the transmission, the radial flange of the drive gear 30.

As already mentioned above, the drive gear 30 is non-rotatably connected to the output of the third stage of the step-down transmission 31. The drive gear 30 comprises a hollow-cylindrical body as indicated at 27, the axis of which is the axis of rotation of the drive gear. At the right-hand end in FIG. 4, the hollow-cylindrical body is closed off with a radial flange which has already been referred to above and in which on the one hand the mounting trunnions 48 of the plant wheels 46 of the third stage of the transmission are mounted and which on the other hand is nonrotatably connected by means of the bolts or screw members 47 to the planet wheel carrier 45 of the third stage of the transmission. Adjoining the radial flange the hollow-cylindrical body 27 of the drive gear 30 is mounted by means of the rolling bearing assembly 91 rotatably in the bore which passes through the stator housing 85 and concentrically relative to the axis thereof but eccentrically relative to the outside circumferential surface of the stator housing 85. The part of the drive gear 30 which is to the left of the rolling bearing assembly 91 is provided with an external tooth configuration 29 which is in meshing engagement with the internal ring gear 12 on the roller body 10.

Arranged in the interior of the hollow-cylindrical body of the drive gear 30 is the brake which has been referred above and which is in the form of a mechanical roller friction brake, for braking the drive gear 30 in a defined manner relative to the base structure 2. As can be seen from FIG. 4, the end of the mounting trunnion 76 which projects axially towards the right in the drawing is supported with a circumferential flange on the inner bearing race of the rolling bearing assembly 92. An annular diaphragm spring 53 in turn bears against the side of the circumferential flange which is at the right in FIG. 4. The diaphragm spring 53 bears with its outside circumference against a brake disk 51 which freely rotatably surrounds the mounting trunnion 76 and which by way of its outside circumference is non-rotatably but axially displaceably connected to the inward surface of the hollow-cylindrical body 27 of the drive gear 30. A second brake disk 50 is non-rotatably but axially slightly movably held to mounting trunnion 76 by means of a for example square projection 74, parallel to and at a spacing from the brake disk 51. A plurality of braking rollers 52 are arranged in circumferentially distributed relationship between the two brake disks 50 and 51 and the brake disk 50 and the inner radial surface of the radially extending flange on the drive gear 30. The rollers 52 are clamped by the diaphragm spring 53 in a predetermined fashion and thereby provide the predetermined braking force. A roller friction brake of that kind is known in regard to its structure and function and does not therefore need to be described in further detail herein.

Figure 7:
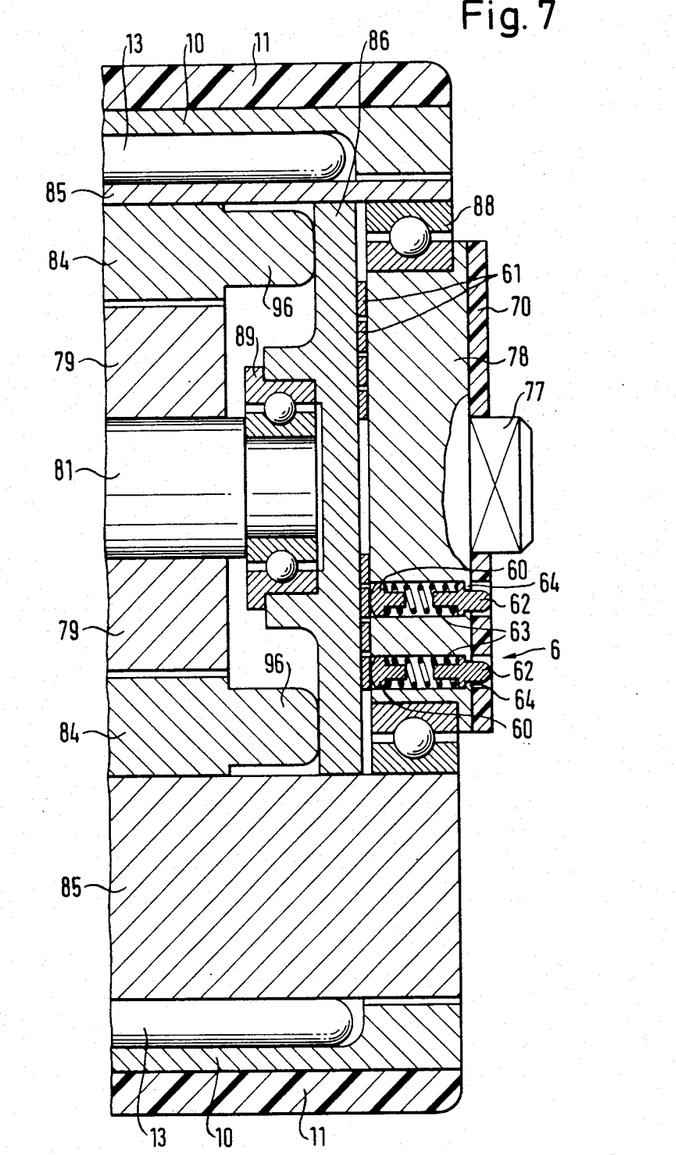
FIG. 7 is a view on an enlarged scale of the part of the drive roller unit shown at the right in FIG. 4, the parts of the roller conveyor track being omitted for the sake of clarity of the drawing.
Figure 8:
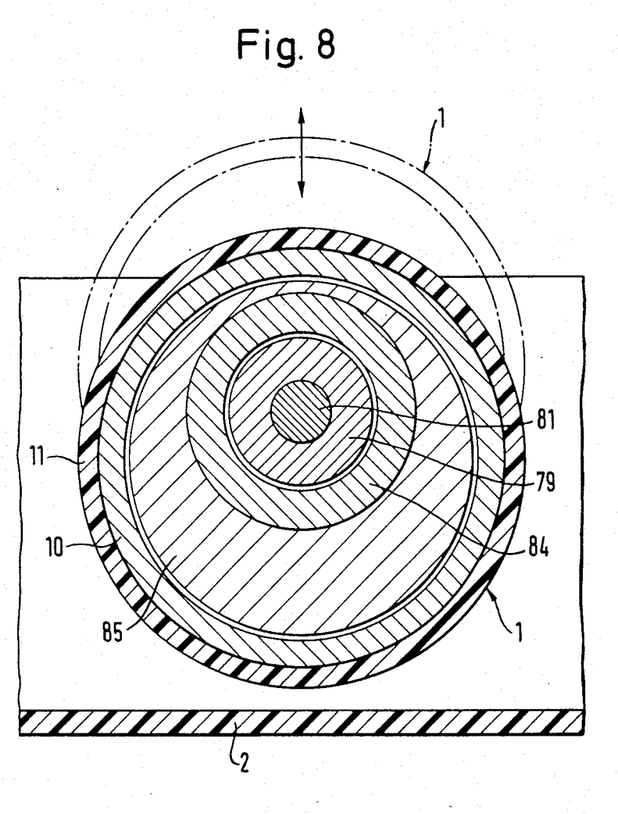
FIG. 8 is a sectional view similar to that shown in FIG. 5 wherein the drive roller unit is shown in solid lines in its rest position relative to the structural portion of the roller conveyor track serves as the base structure, while the roller unit is shown in dash-dotted lines in its raised operative position.

Reference will now be made to FIG. 7 showing a view on an enlarged scale of part of the right-hand end of the drive roller unit shown in FIG. 4, illustrating the arrangement for the supply of power for the stator winding of the electric motor assembly 8.

The flange 86 which is non-rotatably connected to the stator housing 85 and therewith also to the stator body 84 carries on its face which is towards the right in FIG. 7, four concentric contact slip rings which are also concentric with respect to the axis of rotation of the rolling bearing assembly 88 and which are insulated from each other and also from the flange 86 and the mounting plate or disk 78. Each of the slip rings 61 is electrically conductively connected to an associated connection or terminal of the stator winding 96. Four axially extending through bores are formed in the plate or disk 78 in such a way that each of the bores is open towards a respective one of the slip rings. Two contact members 60 and 62 are axially slidably disposed in each of the through bores and are biased relative to each other by a spring 63 disposed therebetween in such a way that the inner contact member in each case is urged against the associated slip ring while the outer contact member 62 of each pair is urged axially outwardly through an associated bore in a resilient insulating sealing plate 70 which is fixed on the right-hand face in FIG. 7 of the mounting plate or disk 78.

The outer end of each of the bores which pass through the plate or disk 78 is formed with a radially inwardly projecting shoulder 64 against which a circumferential flange on the outer contact member 62 in each case can bear so that the outer contact member 62 in each bore cannot be urged entirely out of the bore under the force of the spring 63. It will be appreciated that all the contact members 60 and 62 are insulated relative to the plate or disk 78 while in each case a contact member 60 is electrically conductively connected to the associated contact member 62 within the same bore.

It should be noted that FIG. 7 of the drawing only shows two contact assemblies for two slip rings 61. The other two contact assemblies for the remaining slip rings 61 are arranged in an angularly displaced relationship in respect of the circumference of the plate or disk 78 and are therefore not visible in the sectional view shown in FIG. 7.

When a drive roller unit having the above-described contact assembly is fitted into the structural portion of a roller conveyor track, which provides the base structure 2 for the drive roller unit, as shown in FIG. 4, the outer contact members 62 make electrical contact with contact bars which extend in the longitudinal direction of the roller conveyor track, as is described in our co-pending application (U.S. Ser. No. 160,448 filed Feb. 25, 1988) in respect of a roller conveyor track, to which reference is therefore directed. When the drive roller unit is fitted into the structural portion of the roller conveyor track for receiving same, the sealing plate 70 is compressed in respect of its thickness in such a way that the outer ends of the contact members 62 project towards the right in FIG. 7 beyond the surface of the sealing plate 70 and thus come into electrically conductive contact with the contact bars of the roller conveyor track structure. In that situation the elastic sealing plate 70 provides for securely sealing off the contact bodies 62, to prevent the ingress of dirt or moisture.

The electric motor assembly described in the foregoing embodiment of the invention is preferably in the form of a three-phase asynchronous motor with a squirrel-cage rotor constituting the rotor 80 of the motor.

It will be appreciated that the above-described constructions have been set forth solely by way of example and illustration of the present invention and that various other modifications and alterations may be made therein without thereby departing from the spirit and scope of the invention.

What is claimed is:

1. In a drive roller unit for driving an article on a conveyor track, comprising a drive roller having a gear means thereon, an electric motor means operable to drive the drive roller in rotation, a transmission means connecting the electric motor means to the drive roller and including a drive gear adapted to be driven by the electric motor means and meshing with said gear means non-rotatably disposed on the drive roller, and means for displacing the roller relative to a base means between a lowered rest position and a raised drive position in which it is in engagement with the underside of a said article to be driven, the axis of rotation of the drive gear being stationary relative to said base means, the improvement that the drive roller is substantially in the form of a hollow circular cylinder, the electric motor means and the transmission means are disposed in the interior of the hollow-cylindrical drive roller, the electric motor means has a rotor coupled to the drive gear for driving same, the electric motor has a stator arrangement providing a circular-cylindrical outside circumferential surface which is arranged in eccentric relationship with respect to the axis of rotation of the drive gear and surrounds the rotor, thereby to provide said means for displacing the roller between its rest and operative positions, the hollow-cylindrical drive roller is mounted rotatably on said outside circumferential surface of said stator arrangement concentrically relative thereto, and disposed non-rotatably on the inside of the hollow-cylindrical drive roller and in concentric relationship therewith is an internal ring gear forming said gear means meshing with the drive gear which is eccentric with respect thereto and adapted to be driven thereby in the same direction.

2. A drive roller unit as set forth in claim 1 and further including a step-down transmission means coupling said rotor and said drive gear.

3. A drive roller unit as set forth in claim 2 wherein said step-down transmission means is a planetary transmission means providing first, second and third transmission stages which occur in succession axially in the direction along the axis of rotation of said drive gear.

4. A drive roller unit as set forth in claim 1 and further including a brake means for braking the drive gear relative to said base means.

5. A drive roller unit as set forth in claim 4 wherein said brake means is in the form of a mechanical roller friction brake.

6. A drive roller unit as set forth in claim 1 wherein said stator arrangement comprises a stator body of rotationally symmetrical configurtion coaxial with the rotor and including a stator winding, and a stator housing disposed around said stator body and in eccentric relationship with respect to the rotor, the drive roller being mounted on the circumferential surface of the stator housing, said surface being a circular cross-section.

7. A drive roller unit as set forth in claim 6 and further including a step-down transmission means coupling said rotor and said drive gear wherein said stator housing includes an axial bore extending in eccentric relationship therethrough and in a part of its length accommodating said stator body, the inside wall of said bore having a free portion which is provided with internal tooth means serving as a crown wheel of said step-down transmission means.

8. A drive roller unit as set forth in claim 1 wherein said electric motor means is a three-phase asynchronous motor.

9. A drive roller unit as set forth in claim 6 and further including a plurality of concentric slip rings for supplying power to said stator winding, and spring-biased contact members which are stationary relative to said base and co-operating with said slip rings.

10. A drive roller unit as set forth in claim 1 wherein said drive roller comprises an inner metal roller body portion carrying said internal ring gear means and bearing running surfaces for support bearings, and a roller casing portion which is disposed on the outside circumferential surface of said roller body portion and comprising wear-resistant plastic material.

11. A drive roller unit as set forth in claim 10 wherein said plastic material comprises styrene-butadiene rubber with a Shore hardness of about 60 Shore A.

12. A drive roller unit for driving an article along a conveyor track, comprising: a base mounting structure; a drive roller which is substantially in the form of a hollow cylinder; an internal ring gear means provided on the drive roller non-rotatably with respect thereto and concentrically therewith; an electric motor means disposed within the drive roller and including a stator arrangement having a circular-cylindrical outside circumferential surface, and a rotor within the stator arrangement; means mounting the drive roller rotatably on said outside circumferential surface of said stator arrangement concentrically with respect thereto; a transmission means also disposed within the drive roller and drivingly connecting said electric motor means to said drive roller, the transmission means including therefor a drive gear adapted to driven by said rotor and disposed eccentrically with respect to said internal ring means and meshing with said internal ring gear means to rotate said drive roller, the axis of rotation of said drive gear being stationary with respect to said base mounting structure and said outside circumferential surface of said stator arrangement being disposed eccentrically with respect to said axis of said drive gear, whereby said stator arrangement is adapted to rotate about said axis of said drive gear in eccentric relationship therewith in reaction to said rotor remaining stationary due to inertia thereof upon initial switching-on of said electric motor means, said rotary movement of said stator arrangement causing said drive roller to be displaced relative to said base mounting structure between an inoperative position in which said drive roller is out of driving engagement with a surface of a said article on the conveyor track and an operative position of being moved into engagement against said article surface, to drive same along the conveyor track by said drive roller then being rotated by said drive gear when said movement of said stator arrangement is blocked by said roller engagement against said article surface.

* * * * *